(12) United States Patent
Kitzman et al.

(10) Patent No.: US 9,341,522 B2
(45) Date of Patent: May 17, 2016

(54) SPRING-LOADED TEMPERATURE SENSOR

(71) Applicant: Rosemount Inc., Chanhassen, MN (US)

(72) Inventors: Andrew John Kitzman, Burnsville, MN (US); Andrew Steven Dierker, St. Louis Park, MN (US); Kyle Steven Warren, Shakopee, MN (US); Allen John Kassen, St. Louis Park, MN (US); Dirk Willy Bauschke, Shakopee, MN (US)

(73) Assignee: Rosemount Inc., Chanhassen, MN (US)

( * ) Notice: Subject to any disclaimer, the term of this patent is extended or adjusted under 35 U.S.C. 154(b) by 83 days.

(21) Appl. No.: 14/140,752

(22) Filed: Dec. 26, 2013

(65) Prior Publication Data

US 2015/0185093 A1    Jul. 2, 2015

Related U.S. Application Data

(60) Provisional application No. 61/818,007, filed on May 1, 2013.

(51) Int. Cl.
| | |
|---|---|
| *G01L 1/00* | (2006.01) |
| *G01K 1/10* | (2006.01) |
| *G01K 1/14* | (2006.01) |
| *G01F 15/14* | (2006.01) |
| *G01F 3/12* | (2006.01) |

(52) U.S. Cl.
CPC ... *G01L 1/00* (2013.01); *G01K 1/10* (2013.01); *G01K 1/14* (2013.01); *G01F 3/12* (2013.01); *G01F 15/14* (2013.01)

(58) Field of Classification Search
CPC ............ G01F 15/14; G01F 3/12; G01L 1/00; G01K 1/10; G01K 1/14

USPC ......................................... 73/862.381, 866.5
See application file for complete search history.

(56) References Cited

U.S. PATENT DOCUMENTS

| | | | |
|---|---|---|---|
| 3,751,305 | A | 8/1973 | Huebscher |
| 4,137,768 | A | 2/1979 | Tushie et al. |
| 4,355,912 | A | 10/1982 | Haak |
| 5,065,019 | A * | 11/1991 | Darilek et al. ................ 250/301 |
| 5,632,557 | A | 5/1997 | Simons |
| 5,674,009 | A * | 10/1997 | Stark ............................ 374/209 |
| 5,700,264 | A * | 12/1997 | Zucherman ........ A61B 17/1637 606/170 |
| 5,727,498 | A * | 3/1998 | Hackler et al. ................ 116/206 |

(Continued)

OTHER PUBLICATIONS

International Search Report and Written Opinion, dated Aug. 4, 2014, for PCT Application No. PCT/US2014/033960, 14 pages.

*Primary Examiner* — Lisa Caputo
*Assistant Examiner* — Nathaniel T Woodward
(74) *Attorney, Agent, or Firm* — Kinney & Lange, P.A.

(57) ABSTRACT

A temperature sensor includes a temperature probe, an adapter, a resilient device, and a visual indicator. The temperature probe includes a temperature sensing device disposed at a temperature probe tip. The adapter surrounds a portion of the temperature probe such that the temperature probe is movable within the adapter in a lengthwise direction. The adapter includes a physical reference. The resilient device is adapted to produce a force between the adapter and the temperature probe. The force being variable based on a position of the temperature probe within the adapter. The visual indicator is disposed on a surface of the temperature probe. Alignment of the visual indicator with the physical reference corresponds to a desired force produced by the resilient device.

17 Claims, 6 Drawing Sheets

(56) References Cited

U.S. PATENT DOCUMENTS

| | | | |
|---|---|---|---|
| 6,460,659 B1 * | 10/2002 | Schaffer et al. ......... 188/1.11 W |
| 6,599,012 B2 | 7/2003 | Gul |
| 7,465,086 B1 | 12/2008 | Foreman, Jr. |
| 7,559,150 B2 | 7/2009 | Fernandez |
| 8,390,420 B2 | 3/2013 | Zuchek et al. |
| 2004/0101025 A1 | 5/2004 | Welker |

* cited by examiner

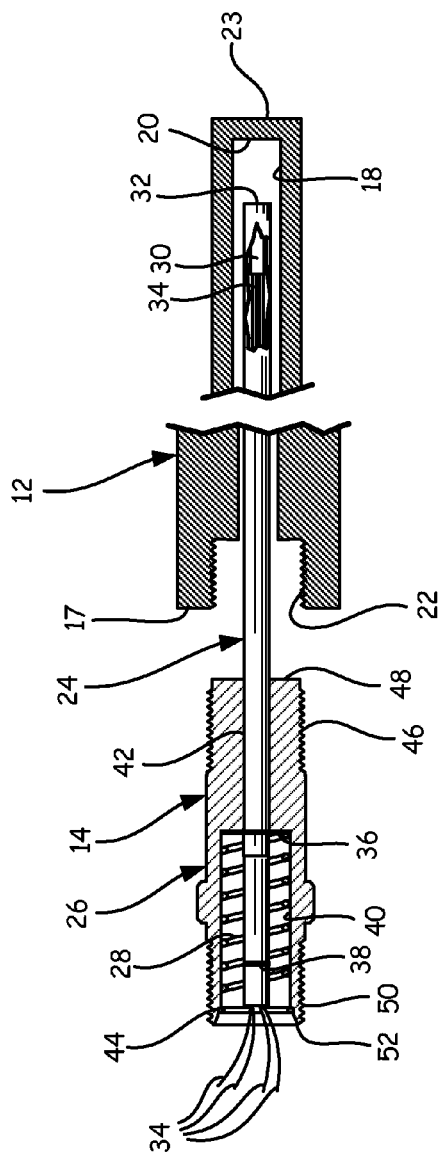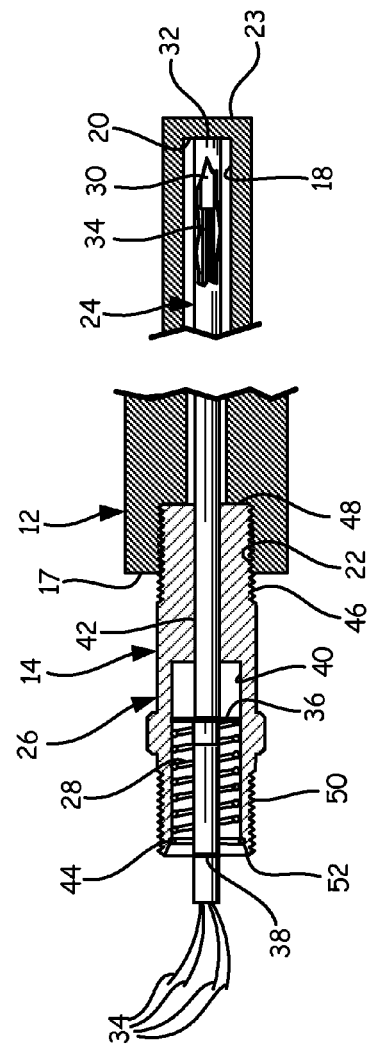
FIG. 2A
FIG. 2B

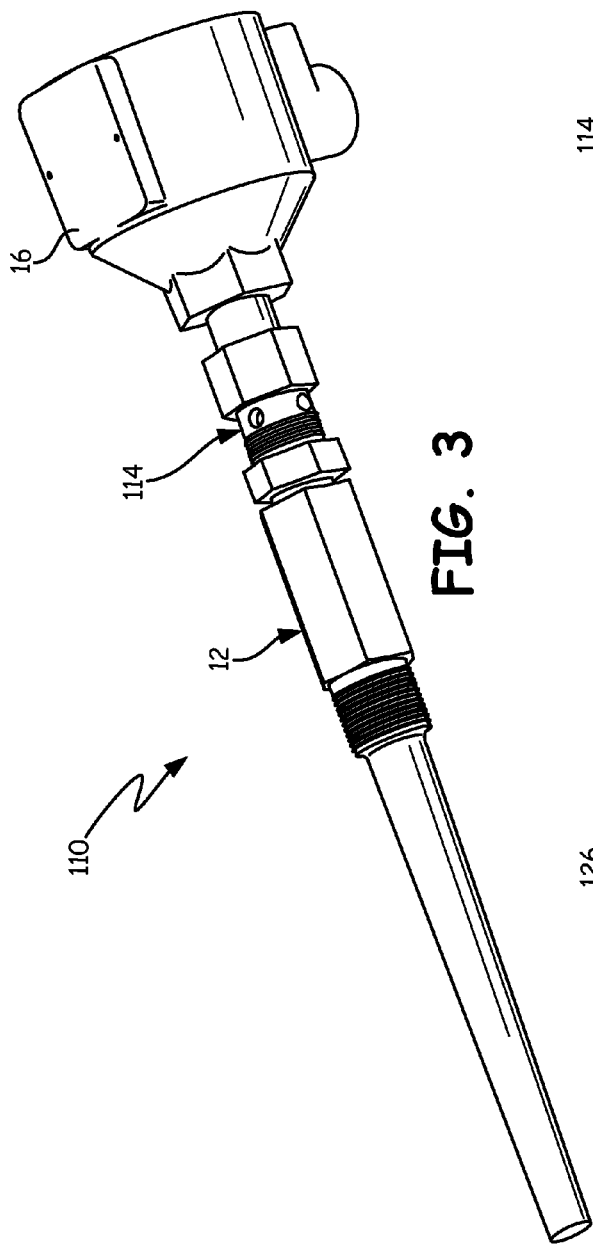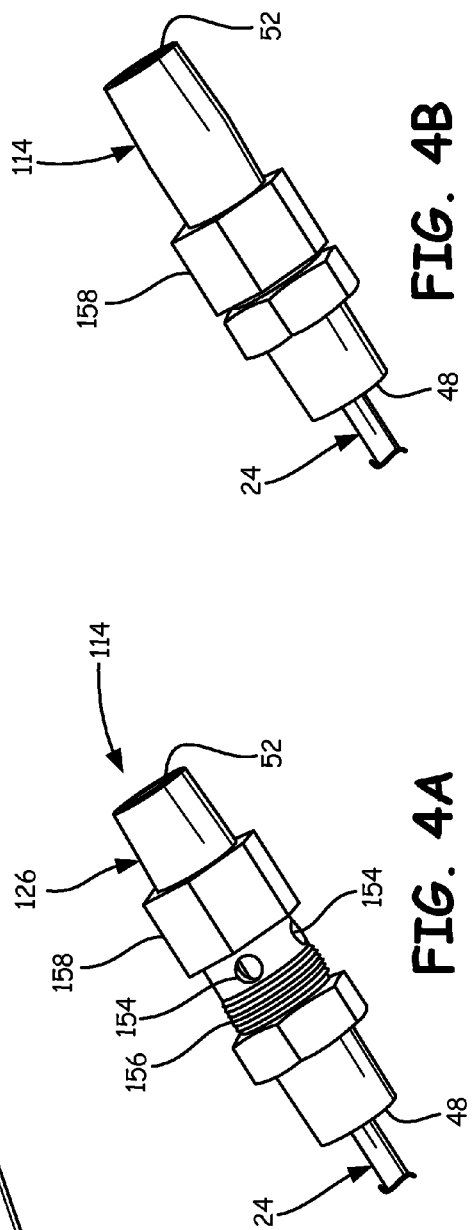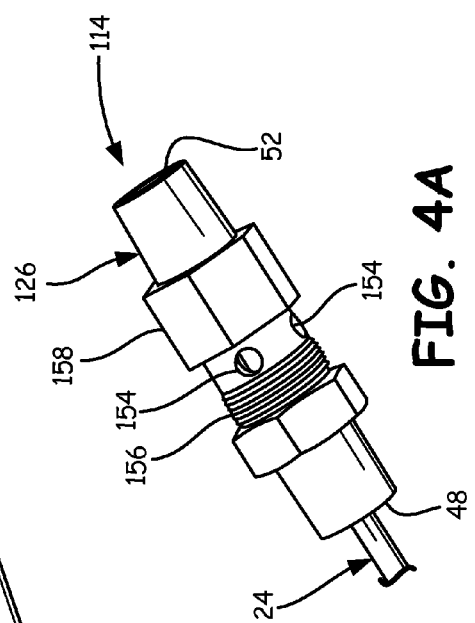

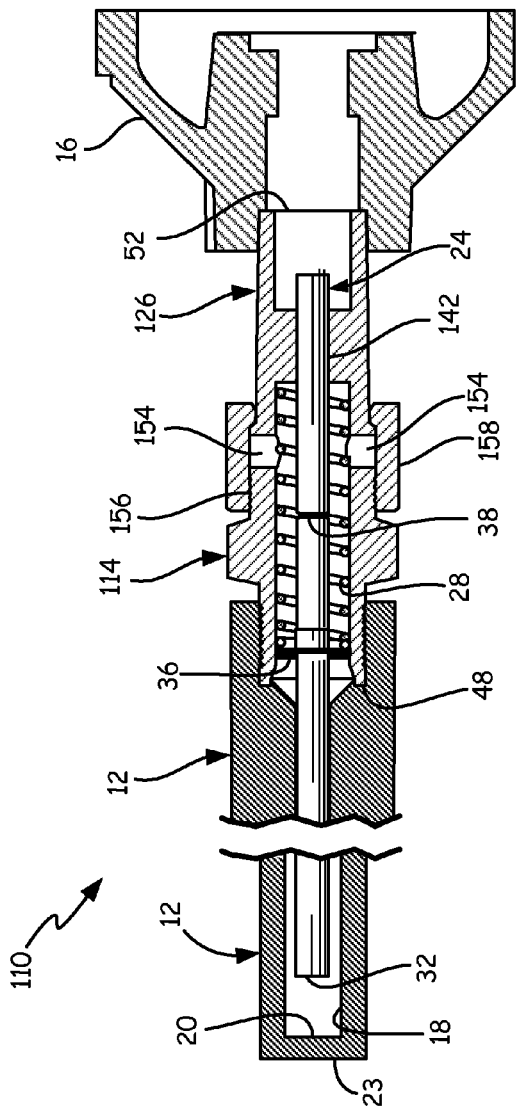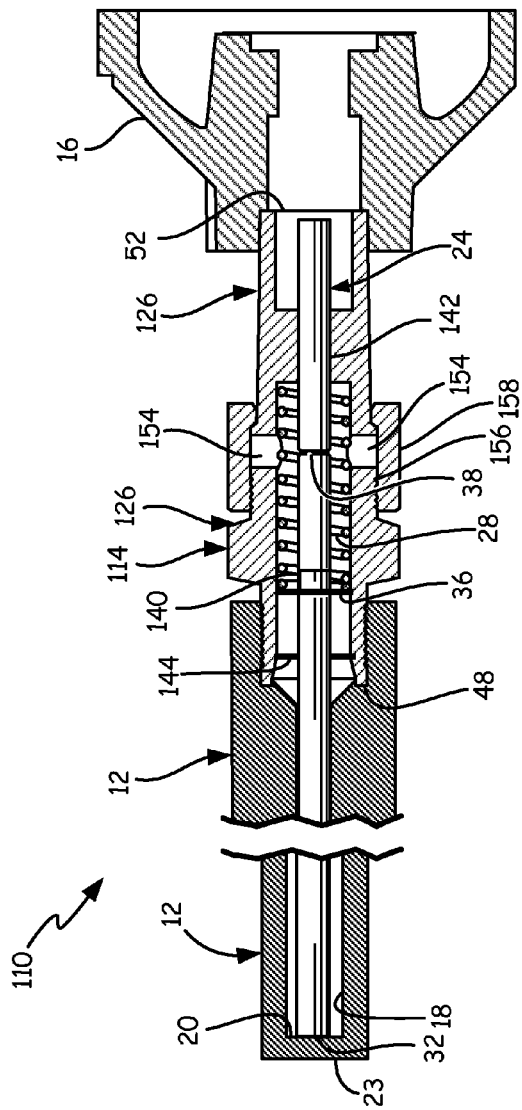

SPRING-LOADED TEMPERATURE SENSOR

BACKGROUND

The present invention relates generally to temperature sensing assemblies for use with industrial processes. In particular, this invention relates to temperature sensors for use with thermowells.

Industrial process temperature sensing assemblies may be used to sense a temperature of fluid flowing through a conduit or contained within a vessel. A temperature sensing assembly includes a temperature sensor, and may also include a thermowell. The temperature sensor includes a temperature probe having a temperature sensing device at or near a probe tip. The probe tip may be inserted into a bore extending into the thermowell to physically contact a base of the thermowell. The thermowell is designed to be in physical contact with the fluid to protect the temperature sensor within the thermowell from physical damage from the fluid, e.g., impacts, corrosion, etc., while efficiently conducting heat between the fluid and the temperature sensor probe tip. A lack of physical contact between the probe tip and the base of the thermowell reduces the conduction efficiency, resulting in a slow response by the temperature sensor to changes in fluid temperature, and may also introduce an error in a temperature reading.

SUMMARY

An embodiment of the present invention is a temperature sensor including a temperature probe, an adapter, a resilient device, and a visual indicator. The temperature probe includes a temperature sensing device disposed at a temperature probe tip. The adapter surrounds a portion of the temperature probe such that the temperature probe is movable within the adapter in a lengthwise direction. The adapter includes a physical reference. The resilient device is adapted to produce a force between the adapter and the temperature probe. The force is variable based on a position of the temperature probe within the adapter. The visual indicator is disposed on a surface of the temperature probe. Alignment of the visual indicator with the physical reference corresponds to a desired force produced by the resilient device.

Another embodiment of the present invention is a temperature sensing assembly including a thermowell and a temperature sensor. The thermowell has a proximal end and a distal end, and includes a bore extending from the proximal end to a base adjacent the distal end. The temperature sensor is connected to the proximal end of the thermowell. The temperature sensor includes a temperature probe, an adapter surrounding a portion of the temperature probe, a resilient device, and a physical reference. The temperature probe includes a temperature sensing device at a temperature probe tip, and a visual indicator on a surface of the temperature probe. The temperature probe tip is disposed within the bore of the thermowell. The adapter connects the sensor to the proximal end of the thermowell. The temperature probe is movable in a lengthwise direction relative to the adapter. The resilient device is adapted to produce a force between the adapter and the temperature probe to force the temperature probe tip away from the adapter. Movement of the temperature probe tip toward the adapter and against the force of the resilient device as a result of physical contact between the temperature probe tip and the base of the thermowell causes the visual indicator of the temperature probe to align with the physical reference to provide an indication of physical contact between the temperature probe tip and the base of the thermowell.

Yet another embodiment of the present invention is a method of determining a loading condition of a temperature probe of a spring-loaded temperature sensor when a temperature probe tip is not readily observable. The method includes installing the temperature sensor. Next, observing whether or not a visual indicator on a surface of the temperature probe and a physical reference on the temperature sensor are aligned. Then, determining a loading condition of the temperature probe based on a relative position of the visual indicator and the physical reference.

BRIEF DESCRIPTION OF THE DRAWINGS

FIGS. 2A and 2B are cross-sectional views of a temperature sensor of the temperature sensing assembly of FIG. 1 illustrating an embodiment having a physical reference at an end of an adapter.

FIG. 3 is a perspective view of another embodiment including in which a physical reference is a viewing port through which a temperature probe is visible.

FIGS. 4A and 4B are perspective views of a temperature sensor of the embodiment of FIG. 3 including a movable collar such that the viewing port is selectively sealable by the movable collar.

FIGS. 5A and 5B are cross-sectional views of the embodiment of FIG. 3 illustrating movement of the temperature probe through an adapter against a resilient device causing a visual indicator of the temperature probe to visibly align with a physical reference of the adapter.

DETAILED DESCRIPTION

Physical contact between a temperature sensor probe tip and a base of a thermowell is an important factor in achieving a fast measurement response to changes in fluid temperature, and maintaining a desired accuracy of a temperature reading. One way to help ensure physical contact is to include a resilient device, such as a spring, in the temperature sensor. The resilient device is adapted to produce a force between a temperature probe and an adapter attached to the thermowell to force, or load, the probe tip into physical contact with the thermowell base. Typically, such "spring-loaded" temperature sensors include a temperature probe having a length exceeding a length of the thermowell bore to ensure operation of the resilient device as the probe tip contacts the thermowell base at the end of the bore. Such a device may ensure sufficient physical contact between the probe tip and the base of the thermowell throughout a range of vibration and temperature conditions under which the temperature assembly may be expected to operate.

The temperature sensing assembly may require replacement of the temperature sensor periodically because thermowells generally outlast temperature sensors. A temperature probe of a replacement temperature sensor may not be as long as the original temperature probe and may not be long enough to contact the thermowell base and operate the resilient device. This may result in a lack of physical contact between the probe tip and the base of the thermowell. Physical contact between the probe tip and the base of the thermowell is not directly observable, however, because the probe tip is within the thermowell bore. Thus, there is no method currently available for verifying physical contact between the probe tip and the base of the thermowell. This may result in unexpectedly poor temperature sensor performance. Embodiments of the present invention overcome this problem with a spring-loaded temperature sensor having a visual indicator on a temperature probe, and a physical reference to which the visual indicator is compared, to verify physical contact between a temperature sensor probe tip and solid surface (such as a base of a thermowell) when physical contact between the temperature probe tip and the solid surface is not readily observable.

Figure 1:
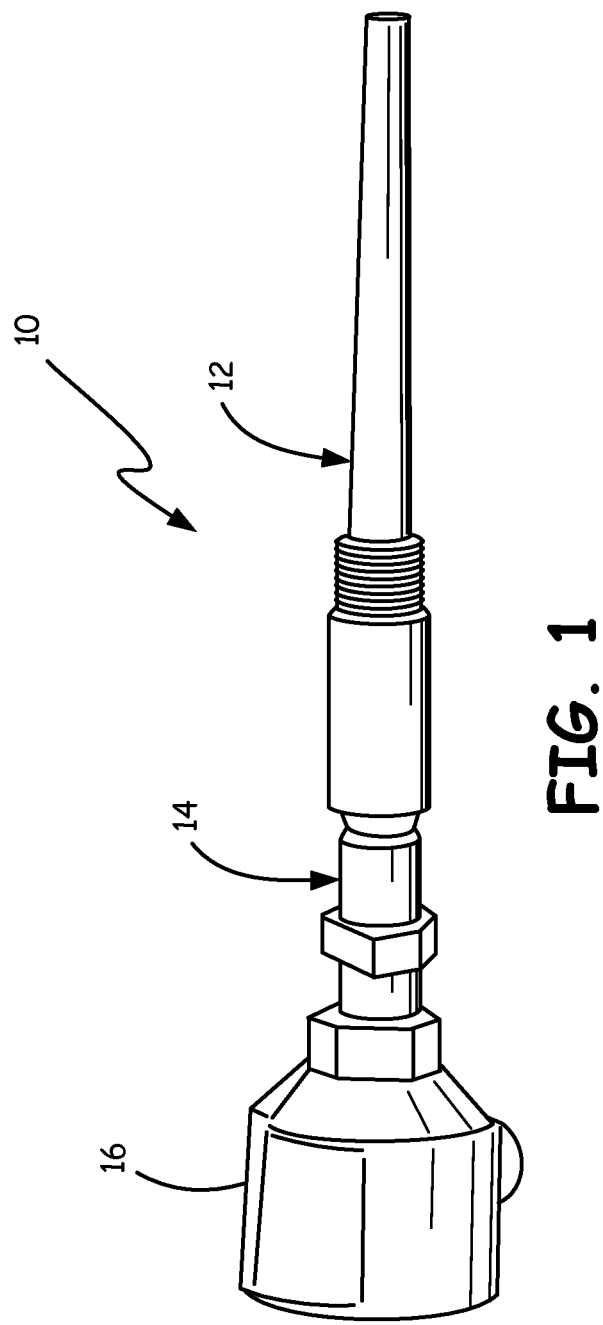
FIG. 1 is perspective view of a temperature sensing assembly embodying the present invention.

FIG. 1 is a perspective view of a temperature sensing assembly embodying the present invention. Temperature sensing assembly 10 includes thermowell 12, temperature sensor 14, and optional electrical housing 16. Electrical housing 16 may include electrical devices, such as a terminal block or transmitter electronics (not shown) electrically connecting temperature sensing assembly 10 to a control or monitoring system (not shown). Thermowell 12 is a sturdy, protective sheath designed to accommodate and protect temperature sensor 14 from the harmful effects of a fluid under measurement, including vibration, impact, corrosion, and abrasion. Temperature sensor 14 is inserted into thermowell 12 along its axis and thermowell 12 is inserted into a process vessel (not shown) containing the fluid under measurement.

FIGS. 2A and 2B are cross-sectional views of a portion of temperature sensing assembly 10 including thermowell 12 and temperature sensor 14. As shown in FIGS. 2A and 2B, thermowell 12 is substantially a hollow cylinder open at proximal end 17 and includes bore 18, base 20, and internal threads 22. Bore 18 extends axially along the length of thermowell 12 from proximal end 17 to base 20. Base 20 is an internal surface of thermowell 12 adjacent to distal end 23. Internal threads 22 are disposed at proximal end 17.

Pursuant to this one embodiment, temperature sensor 14 includes temperature probe 24, adapter 26, and resilient device 28. Resilient device 28 may be a spring, as illustrated. Temperature probe 24 is substantially a hollow cylinder and includes temperature sensing device 30 disposed at probe tip 32, sensor wires 34, probe flange 36, and visual indicator 38. Sensor wires 34 extend from temperature sensing device 30, through the length of temperature probe 24, and emerge from temperature probe 24 at and end opposite probe tip 32. Temperature sensing device 30 may be, for example, a thermocouple, a thermistor, or a resistance temperature detector (RTD) having thin-film or wire-wound elements. Probe flange 36 projects outward from an exterior of temperature probe 24. Visual indicator 38 is a readily visible indicator extending around an external circumference of temperature probe 24. Visual indicator 38 may be, for example, a physically raised or indented ring in the external surface of temperature probe 24, a ring having a color contrasting with the external surface of temperature probe 24 (e.g., a painted band), or a separate component attached to the external surface of temperature probe 24 and having a ring-like feature. Visual indicator 38 may form a continuous ring or a discontinuous ring, such as a dotted line.

Adapter 26 is a hollow, elongated structure including cavity wall 40, flame path wall 42, and ridge 44. Adapter 26 further includes external thermowell connection threads 46 at thermowell connection end 48, and external housing connection threads 50 at housing connection end 52. Cavity wall 40 forms a cavity extending through a portion of adapter 26 in an axial direction from housing connection end 52. Flame path wall 42 extends from cavity wall 40 to thermowell connection end 48. Ridge 44 projects radially inward from cavity wall 40 near housing connection end 52. Ridge 44 may be, for example, a retention ring or snap ring inserted into a channel formed into cavity wall 40, or an integral feature machined or otherwise formed onto cavity wall 40.

Temperature probe 24 is disposed partially within adapter 26 and coaxially with adapter 26 such that cavity wall 40 circumferentially surrounds probe flange 36 and probe tip 32 projects out from thermowell connection end 48. A portion of temperature probe 24 is circumferentially surrounded by flame path wall 42 forming a gap between flame path wall 42 and temperature probe 24. Electrical housing 16 (FIG. 1) may be designed to meet agency regulations for an explosion proof rating. Should explosive gases from outside electrical housing 16 enter electrical housing 16 and be ignited by electrical devices within, this gap provides a flame path along which any resulting hot gases may flow while reducing the temperature of the hot gases to a level insufficient to ignite the volatile atmosphere outside electrical housing 16.

Resilient device 28 is disposed between, and acts against, ridge 44 of adapter 26 and probe flange 36 such that resilient device 28 may produce a force between adapter 26 and temperature probe 24. The force between adapter 26 and temperature probe 24 is variable based on a position of temperature probe 24 within adapter 26. FIG. 2A illustrates temperature sensor 14 as probe tip 32 of temperature probe 24 is inserted into bore 18 of thermowell 12, but not fully installed. As shown in FIG. 2A, probe tip 32 is not in physical contact with base 20, thus resilient device 28 operates to force probe tip 32 of temperature probe 24 away from thermowell connection end 48 of adapter 26 until probe flange 36 reaches an end of the cavity formed by cavity wall 40. As temperature probe 24 is further inserted into bore 18, external thermowell connection threads 46 of adapter 26 are threadedly engaged with internal threads 22 at proximal end 17 of thermowell 12, as shown in FIG. 2B, bringing probe tip 32 into physical contact with base 20. As temperature probe 24 continues to be threaded into thermowell 12, temperature probe 24 begins to move through adapter 26 and against resilient device 28, varying the force between adapter 26 and temperature probe 24 produced by resilient device 28. This movement brings visual indicator 38 toward housing connection end 52 of adapter 26.

FIG. 2B shows temperature sensor 14 fully installed in thermowell 12. As shown in FIG. 2B, temperature probe 24 has moved far enough through adapter 26 such that visible indicator 38 visibly aligns with housing connection end 52. In this embodiment, housing connection end 52 serves as a physical reference of adapter 26. By observing alignment between visual indicator 38 and housing connection end 52, physical contact between probe tip 32 and base 20 of thermowell 12 is verified. Should visual indicator 38 not be visibly aligned with the physical reference, housing connection end 52, a lack of physical contact between probe tip 32 and base 20 may be inferred, even though physical contact between probe tip 32 and base 20 of thermowell 12 is not directly observable.

In some embodiments where visual indicator 38 is not visibly aligned with housing connection end 52, probe tip 32 does not physically contact base 20 and there is no movement of temperature probe 24 through adapter 26 against resilient device 28. This may occur, for example, if temperature sensor 14 is available in various lengths and the wrong length is selected for use with thermowell 12. In other embodiments where visual indicator 38 is not visibly aligned with housing connection end 52, and probe tip 32 does physically contact base 20, but movement of temperature probe 24 through adapter 26 against resilient device 28 is insufficient to produce a desired force between adapter 26 and temperature probe 24 sufficient to maintain physical contact between probe tip 32 and base 20 throughout a range of vibration and temperature conditions under which temperature assembly 10 may be expected to operate. This may occur, for example, in cases where the length of bore 18 varies outside of manufacturing tolerances for thermowell 12. Visual indicator 38 is positioned along the surface of temperature probe 24 such that visible alignment between visual indicator 38 and housing connection end 52 indicates that operation of resilient device 28 between adaptor 26 and temperature probe 24 is sufficient to produce the desired force, ensuring physical contact between probe tip 32 and base 20 throughout the range of vibration and temperature conditions under which temperature assembly 10 may be expected to operate.

Once temperature probe 24 is found to be sufficiently loaded by observing alignment between visual indicator 38 and housing connection end 52, electrical housing 16 (FIG. 1) may be optionally installed by threadedly engaging external housing connection threads 50 at housing connection end 52. If it is found that temperature probe 24 is not sufficiently loaded by observing that visual indicator 38 and housing connection end 52 are not aligned, temperature sensor 14 may be replaced.

FIG. 3 is a perspective view of an embodiment of the present invention in which a physical reference is a viewing port through which a temperature probe is visible. Temperature sensing assembly 110 includes thermowell 12, temperature sensor 114, and optional electrical housing 16. Thermowell 12 and electrical housing 16 are as described above in reference to FIGS. 1, 2A, and 2B.

FIGS. 4A and 4B are perspective views of temperature sensor 114 of the embodiment of FIG. 3. Temperature sensor 114 is similar to temperature sensor 14 described above, with like numbers referring to like features. Temperature sensor 114 includes temperature probe 24 and adapter 126. Adapter 126 includes viewing port 154, collar threads 156, and movable collar 158. In this embodiment, viewing port 154 serves as a physical reference of adapter 126, instead of housing connection end 52 as describe in reference to FIGS. 2A and 2B. Viewing port 154 is a radial opening into adapter 126 thorough which temperature probe 24 is visible. Movable collar 158 includes threads that engage collar threads 156 to cover and seal viewing port 154. FIG. 4A illustrates movable collar 158 unthreaded from collar threads 156 such that temperature probe 24 within adapter 126 is visible through viewing port 154. FIG. 4B illustrates movable collar 158 threaded onto collar threads 156 such that viewing port 154 is covered and sealed to provide an environmental barrier.

At least one viewing port 154 is necessary for this embodiment, but one or more additional viewing ports 154 may be employed for ease of use. A plurality of viewing ports 154, as shown in FIG. 4A, provides for additional physical references for observing temperature probe 24. All of the viewing ports 154 may be covered and sealed by movable collar 158.

FIGS. 5A and 5B are cross-sectional views of the embodiment of FIG. 3 illustrating movement of temperature probe 24 through adapter 126 against resilient device 28 causing visual indicator 38 of temperature probe 24 to visibly align with a physical reference of adapter 126, the physical reference being viewing port 154.

Adapter 126 is a substantially hollow, elongated structure further including cavity wall 140, flame path wall 142, and ridge 144. Cavity wall 140 forms a cavity extending through a portion of adapter 126 in an axial direction from thermowell connection end 48. Flame path wall 142 extends from the cavity formed by cavity wall 140 toward housing connection end 52. Ridge 144 projects radially inward from cavity wall 140 near thermowell connection end 48.

Temperature probe 24 is disposed partially within adapter 126 and coaxially with adapter 126 such that cavity wall 140 circumferentially surrounds probe flange 36 and probe tip 32 projects out from thermowell connection end 48. As with the embodiment described above in reference to FIGS. 2A and 2B, a flame path is formed along which hot gases may flow from electrical housing 16 while reducing the temperature of the hot gases to a level insufficient to ignite a volatile atmosphere. A portion of temperature probe 24 is circumferentially surrounded by flame path wall 142 forming a gap between flame path wall 142 and temperature probe 24, providing the desired flame path. In this embodiment, viewing port 154 and movable collar 158 do not have to be designed meet agency regulations for an explosion proof rating because the flame path is between electrical housing 16 and the physical reference, viewing port 154.

Resilient device 28 is disposed between, and acts against, ridge 144 of adapter 126 and probe flange 36 such that resilient device 28 may apply a force between adapter 126 and temperature probe 24. The force between adapter 126 and temperature probe 24 is variable based on a position of temperature probe 24 within adapter 126. FIG. 5A illustrates a case in which although temperature sensor 114 is fully installed into thermowell 12, probe tip 32 is not in physical contact with base 20 due to, for example, a length mismatch between bore 18 and temperature probe 24. The lack of contact results in no movement of temperature probe 24 through adapter 126 against resilient device 28. Thus, visible indicator 38 does not align with viewing port 154, which is readily observed by unthreading movable collar 158 from collar threads 156 to uncover viewing port 154. After observing that visible indicator 38 does not align with viewing port 154, temperature sensor 114 may be replaced because the lack of alignment indicates that the operation of resilient device 28 between adaptor 126 and temperature probe 24 is insufficient to produce a desired force necessary to ensure physical contact between probe tip 32 and base 20 throughout the range of vibration and temperature conditions under which temperature assembly 110 may be expected to operate.

FIG. 5B illustrates a case in which once temperature sensor 114 is fully installed into thermowell 12, the operation of resilient device 28 between adaptor 126 and temperature probe 24 is sufficient produce the desired force necessary to ensure physical contact between probe tip 32 and base 20 throughout the range of vibration and temperature conditions under which temperature assembly 10 may be expected to operate. In FIG. 5B, temperature probe 24 has moved far enough through adapter 126 such that visible indicator 38 visibly aligns with viewing port 154, which is readily observed by unthreading movable collar 158 from collar threads 156 to uncover viewing port 154. By observing visual indicator 38 through viewing port 154, the force produced by resilient device 28 between adaptor 126 and temperature probe 24 is verified to be sufficient to ensure physical contact between probe tip 32 and base 20 throughout the range of vibration and temperature conditions under which temperature assembly 110 may be expected to operate.

Figure 6:
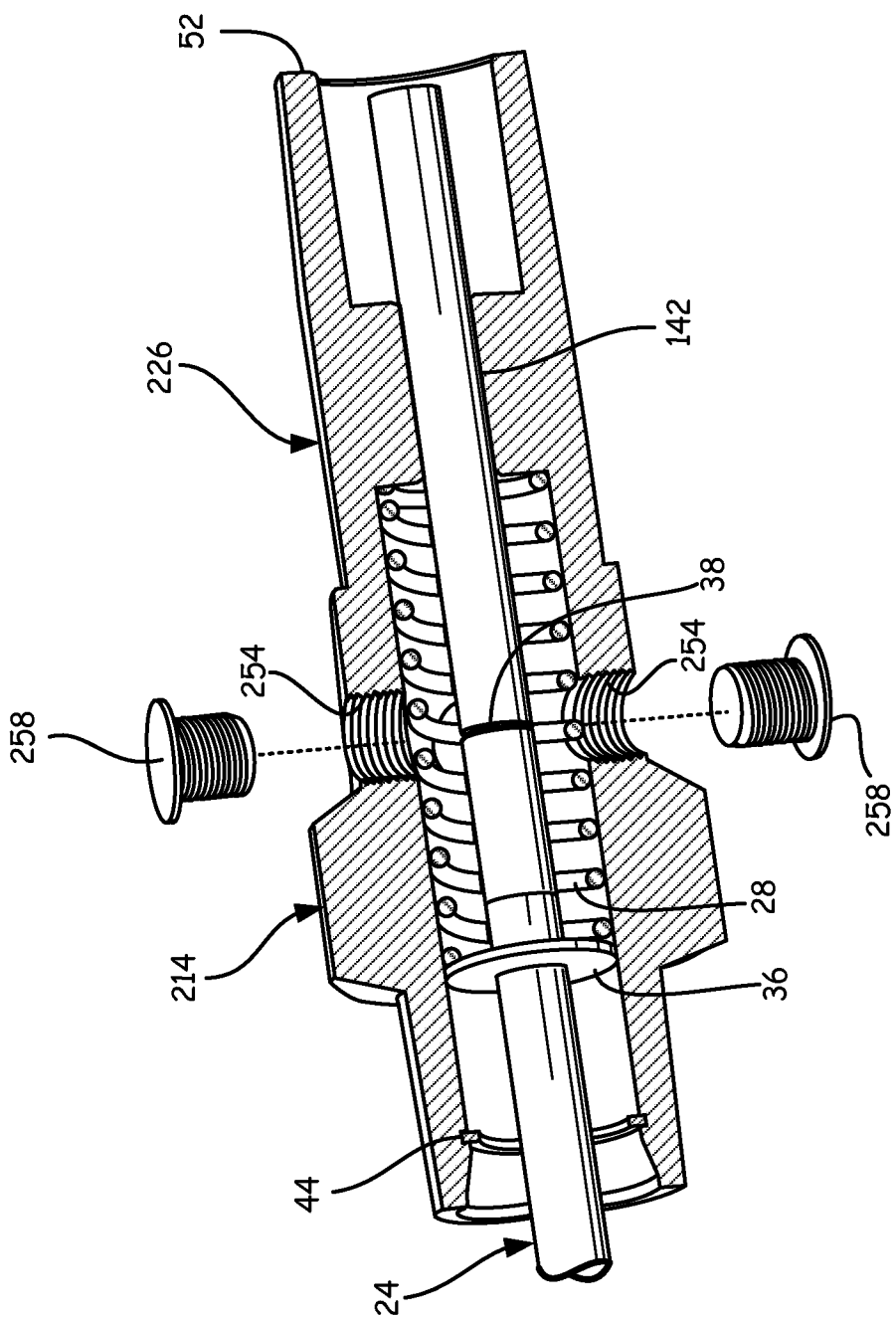
FIG. 6 is a cross-section illustrating another temperature sensor embodiment including a viewing port through which a temperature probe is visible and further including a cover threaded into the viewing port to seal the viewing port.

FIG. 6 is a cross-section illustrating another temperature sensor embodiment including a viewing port through which a temperature probe is visible and further including a cover threaded into the viewing port to seal the viewing port. Temperature sensor 214 is similar to temperature sensor 114 described above, with like numbers referring to like features. Temperature sensor 214 includes temperature probe 24 and adapter 226, instead of adapter 126. Adapter 226 includes viewing port 254 and threaded cover 258. Viewing port 254 is identical to viewing port 154, except that it includes threads for engaging threaded cover 258. Operation of temperature sensor 214 is identical to temperature sensor 114 described above, except that alignment between visual indicator 38 and viewing port 254 is observed by unthreading and removing threaded cover 258 from viewing port 254.

Figure 7:
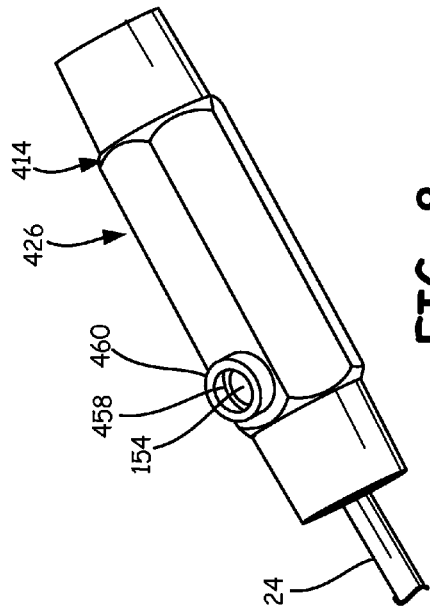
FIG. 7 illustrates another temperature sensor embodiment including a viewing port through which a temperature probe is visible and further including a hinged cover such that the viewing port is selectively sealable by the hinged cover.

FIG. 7 illustrates another temperature sensor embodiment including a viewing port through which a temperature probe is visible and further including a hinged cover such that the viewing port is selectively sealable by the hinged cover. Temperature sensor 314 is similar to temperature sensor 114 described above and includes adapter 326 instead of adapter 126. Adapter 326 includes viewing port 154, hinged cover 358, and hinge 360. Hinged cover 358 may be rotated about hinge 360 to uncover and cover viewing port 154 as necessary to observe alignment between visual indicator 38 and viewing port 154. Operation of temperature sensor 314 is identical to temperature sensor 114 described above, except that alignment between visual indicator 38 and viewing port 154 is observed by rotating hinged cover 358 about hinge 360 to uncover viewing port 154. Hinged cover 358 may include a dimple to seat within viewing port 154, securing hinged cover 358 with enough force in the closed position to provide a desired level of environmental protection. Hinge 360 may be a rivet through a portion of hinged cover 358 and into adapter 326.

Figure 8:
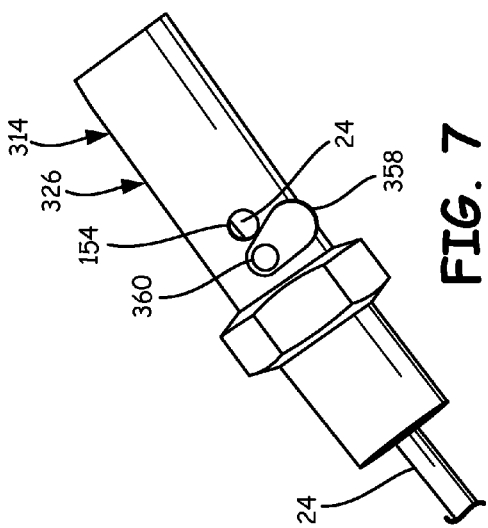
FIG. 8 illustrates another temperature sensor embodiment including a viewing port through which a temperature probe is visible and the viewing port is sealed by a transparent window.

FIG. 8 illustrates another temperature sensor embodiment including a viewing port through which a temperature probe is visible and further including a transparent window to seal the viewing port. Temperature sensor 414 is similar to temperature sensor 114 described above and includes adapter 426 instead of adapter 126. Adapter 426 includes viewing port 154, window 458, and window frame 460. Window 458 is a sealed glass or similar transparent material. Window 458 is secured within window frame 460. Window frame 460 is attached to adapter 426 such that viewing port 154 and temperature probe 24, are visible through window 458. Window frame 460 may be attached to adapter 426 as necessary to provide a desired level of environmental protection by, for example, laser welding or TIG welding. Operation of temperature sensor 414 is identical to temperature sensor 114 described above, except that alignment between visual indicator 38 and viewing port 154 is observed merely by peering through window 458.

Figure 9:
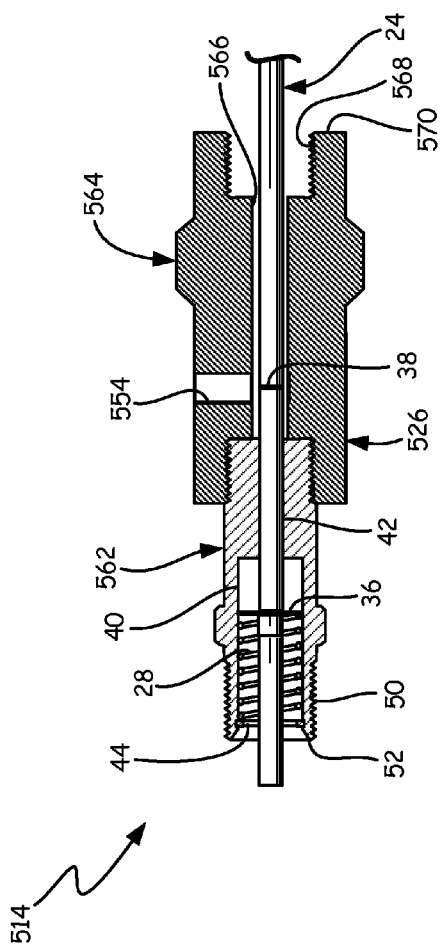
FIG. 9 is a cross-section illustrating another temperature sensor embodiment in which the adapter includes a first component including the resilient device and a second component including the physical reference.

FIG. 9 is a cross-section illustrating an embodiment of the present invention in which an adapter includes a first component and a second component. A resilient device is adapted to operate between the first component and a temperature probe. The second component includes the viewing port as a physical reference through which a temperature probe is visible. Temperature sensor 514 is similar to temperature sensor 14 described above in reference to FIGS. 1, 2A, and 2B and includes adapter 526 instead of adapter 26. Adapter 526 includes first component 562 and second component 564. Such dual component adapter structures are useful for increasing a distance between temperature-sensitive electronics within electrical housing 16 and a high temperature environment sensed by temperature probe 24. In addition, first component 562 and second component 564 are connected to each other by a threaded connection that facilitates orienting electrical housing 16 (FIG. 1).

First component 562 is similar to adapter 26 as described above in reference to FIGS. 1, 2A, and 2B, except that first component 562 does not include a physical reference. First component 562 is a substantially hollow, elongated structure including cavity wall 40, flame path wall 42, and ridge 44. First component 562 further includes external housing connection threads 50 at housing connection end 52. Cavity wall 40 forms a cavity extending through a portion of first component 562 in an axial direction from housing connection end 52. Ridge 44 projects radially inward from cavity wall 40 near housing connection end 52.

Second component 564 is a substantially hollow, elongated structure including viewing port 554, cavity wall 566, and internal extension connection threads 568 at extension connection end 570. Cavity wall 566 forms a cavity extending through first component 562 in an axial direction from first component 562. Internal extension connection threads 568 are for threadedly engaging a threaded extension pipe (not shown). The threaded extension pipe would also thread into internals threads 22 of thermowell 12 (FIGS. 2A and 2B) at an end opposite extension connection end 570. This arrangement extends any electronics in electrical housing 16 (FIG. 1) away from a hot environment experienced by thermowell 12. Viewing port 554 is a radial opening into second component 564 through which temperature probe 24 is visible.

Temperature probe 24 is disposed partially within, and is coaxial with, first component 562 and second component 564 such that cavity wall 40 circumferentially surrounds probe flange 36, and an end of temperature probe 24 including probe tip 32 projects out from extension connection end 570. A portion of temperature probe 24 is circumferentially surrounded by flame path wall 42 forming a gap between flame path wall 42 and temperature probe 24.

Resilient device 28 is disposed between, and acts against, ridge 44 of first component 562 and probe flange 36 such that resilient device 28 may apply a force between first component 562 and temperature probe 24. The force between first component 562 and temperature probe 24 is variable based on a position of temperature probe 24 within first component 562. FIG. 9 shows temperature sensor 514 fully installed such that temperature probe 24 has moved far enough through adapter 526 that visible indicator 38 visibly aligns with viewing port 554. By comparing visual indicator 38 to viewing port 554, operation of resilient device 28 between first component 562 and temperature probe 24 sufficient to ensure physical contact between probe tip 32 and base 20 of thermowell 12 throughout an expected range of vibration and temperature conditions is verified. Viewing port 554 may be covered and sealed to provide an environmental barrier by employing any of the devices describe above for viewing port 154 (FIGS. 4A and 4B), viewing port 254 (FIG. 6), viewing port 354 (FIG. 7), or viewing port 454 (FIG. 8).

Although the embodiments described above are illustrated for temperature sensors used with thermowells, it will be understood by those skilled in the art that embodiments of the present invention are not limited to thermowell applications. Temperature sensors embodying the present invention may be useful in any application in which physical contact between a temperature probe tip and a solid surface is desired, and such contact is not readily visible. Also, although the embodiments described above are illustrated for temperature sensors employing a coiled spring as a resilient device, it is understood that the present invention encompasses embodiments employing equivalent devices, for example, elastomeric polymers resilient in either compression or tension, or springs of other than a coiled configuration.

Embodiments of the present invention overcome the problem of verifying physical contact between a probe tip of a temperature sensor and a solid surface by employing a spring-loaded temperature sensor having a visual indicator on a temperature probe and a physical reference to which the visual indicator is compared. Should the visual indicator not be visibly aligned with the physical reference, a lack of physical contact between the probe tip and the solid surface may be inferred. A lack of alignment between the visual indicator and the physical reference may indicate that the movement of the temperature probe against the spring, or resilient device, is insufficient to produce a load force sufficient to maintain physical contact between the probe tip and the solid surface throughout a range of vibration and temperature conditions under which a temperature assembly incorporating the temperature sensor may be expected to operate.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A temperature sensor for use in an industrial process temperature sensor assembly, the sensor comprising:
    a temperature probe including a temperature sensing device disposed at a temperature probe tip;
    an adapter surrounding a portion of the temperature probe, the temperature probe being movable within the adapter in a lengthwise direction, the adapter including:
        a housing connection end for connecting to an electrical housing;
        a thermowell connection end for connecting to a thermowell;
        a cavity wall that defines a cavity that extends through a portion of the adapter in an axial direction from the thermowell connection end;
        a viewing port radially extending through the cavity wall of the adapter through which a portion of the temperature probe within the cavity is visible; and
        a flame path wall that extends from the cavity toward the housing connection end;
    a resilient device adapted to produce a force between the adapter and the temperature probe, the force being variable based on a position of the temperature probe within the adapter; and
    a visual indicator disposed on a surface of the temperature probe, wherein visibility of the visual indicator through the viewing port corresponds to the temperatures probe tip being engaged with a solid surface.

2. The sensor of claim 1, wherein the desired force produced by the resilient device is sufficient to maintain physical contact between the temperature probe tip and the solid surface.

3. The sensor of claim 1, wherein the viewing port is sealed by a transparent window.

4. The sensor of claim 1, wherein the adapter further includes a hinged cover such that the viewing port is selectively sealable by the hinged cover.

5. The sensor of claim 1, further including a movable collar such that the viewing port is selectively sealable by the movable collar.

6. The sensor of claim 1, further including a cover threaded into the viewing port to seal the viewing port.

7. The sensor of claim 1, wherein the adapter further includes one or more additional viewing ports.

8. The sensor of claim 1, wherein the adapter includes a first component and a second component connected to the first component, such that the resilient device is adapted to produce a force between the first component and the temperature probe, and the second component includes the viewing port.

9. An industrial process temperature sensing assembly comprising:
    a thermowell having a proximal end and a distal end, the thermowell including a bore extending from the proximal end to a base adjacent the distal end;
    a temperature sensor connected to the proximal end of the thermowell, the sensor including:
        a temperature probe including:
            a temperature sensing device disposed at a temperature probe tip, the temperature probe tip disposed within the bore of the thermowell; and
            a visual indicator on a surface of the temperature probe;
        an adapter surrounding a portion of the temperature probe, the temperature probe being movable in a lengthwise direction relative to the adapter, the adapter connecting the sensor to the proximal end of the thermowell, wherein the adapter includes a thermowell connection end, a housing connection end, a cavity wall defining a cavity that extends through a portion of the adapter from the thermowell connection end, and a flame path wall that extends from the cavity toward the housing connection end;
        a resilient device adapted to produce a force between the adapter and the temperature probe to force the temperature probe tip away from the adapter; and
        a viewing port extending through the cavity wall of the adapter to the cavity, through which a portion of the temperature probe is visible, wherein movement of the temperature probe tip toward the adapter and against the force of the resilient device as a result of physical contact between the temperature probe tip and the base of the thermowell causes the visual indicator of the temperature probe to be visible through the viewing port to provide an indication of physical contact between the temperature probe tip and the base of the thermowell.

10. The assembly of claim 9, wherein visibility of the visual indicator through the viewing port further indicates that the force produced by the resilient device is sufficient to maintain physical contact between the temperature probe tip and the base of the thermowell.

11. The assembly of claim 9, wherein the viewing port is sealed by a transparent window.

12. The assembly of claim 9, further including a cover threaded into the viewing port to seal the viewing port.

13. The assembly of claim 9, further including a movable collar such that the viewing port is selectively sealable by the movable collar.

14. The assembly of claim 9, wherein the adapter includes a first component and a second component connected to the first component, such that the resilient device operates between the first component and the temperature probe, and the second component includes the viewing port.

15. A method of determining a loading condition of a temperature probe of a spring-loaded temperature sensor when a temperature probe tip is not readily observable, the method comprising:
    installing the temperature sensor through an adapter into a thermowell, wherein the adapter includes a housing connection for connecting to an electrical housing, a thermowell connection for connecting to a thermowell, a cavity wall that defines a cavity that extends through a portion of the adapter in an axial direction from the thermowell connection end, a viewing port radially extending through the cavity wall of the adapter through which a portion of the temperature probe is visible, and a flame path wall that extends from the cavity toward the housing connection end;
    observing whether or not a visual indicator on a surface of the temperature probe is visible through a viewing port, wherein the viewing port is located in the cavity of the adapter; and
    determining a loading condition of the temperature probe based on a relative position of the visual indicator with respect to the viewing port.

16. The method of claim 15, wherein determining the loading condition includes finding that there is sufficient loading of the temperature probe when the visual indicator is visible in the viewing port, or finding that there may not be sufficient loading of the temperature probe when the visual indicator is not visible in the viewing port.

17. The method of claim 15, wherein observing whether or not a visual indicator on a surface of the temperature probe and a viewing port are aligned includes uncovering a viewing port on the temperature sensor through which the visual indicator may be viewed, the viewing port being the physical reference.

* * * * *